T. ELLIOTT.
CAR TRUCK.
APPLICATION FILED JUNE 9, 1919.

1,335,225.

Patented Mar. 30, 1920.
3 SHEETS—SHEET 1.

Inventor
Thomas Elliott,
Toulmin & Toulmin,
Attorneys

T. ELLIOTT.
CAR TRUCK.
APPLICATION FILED JUNE 9, 1919.
1,335,225.
Patented Mar. 30, 1920.
3 SHEETS—SHEET 2.
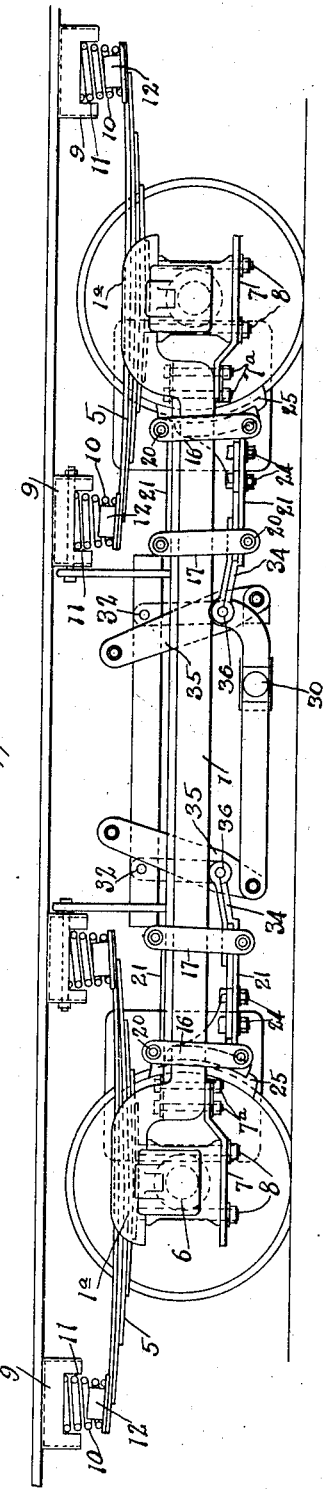
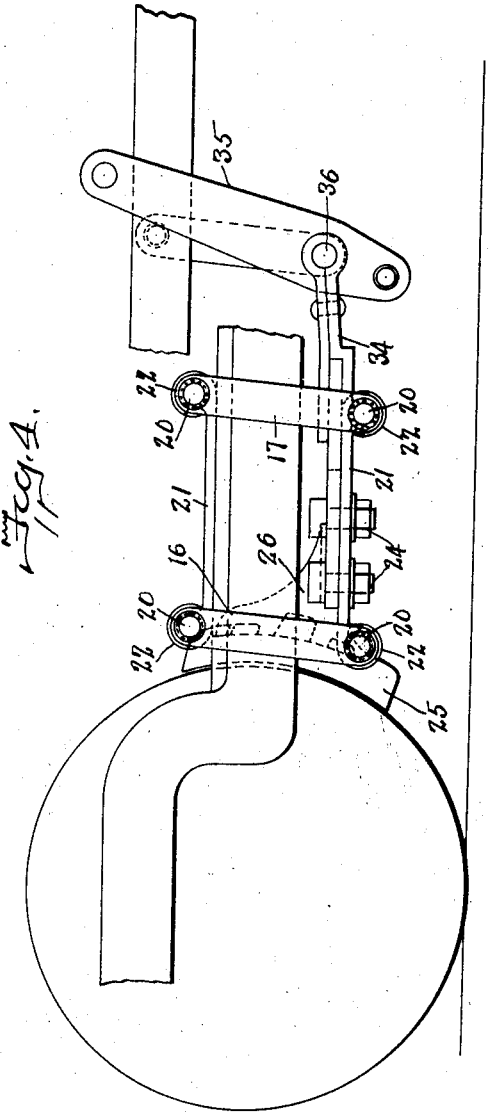
Inventor
Thomas Elliott.
Toulmin & Toulmin,
Attorneys T. ELLIOTT.
CAR TRUCK.
APPLICATION FILED JUNE 9, 1919.
1,335,225.
Patented Mar. 30, 1920.
3 SHEETS—SHEET 3.
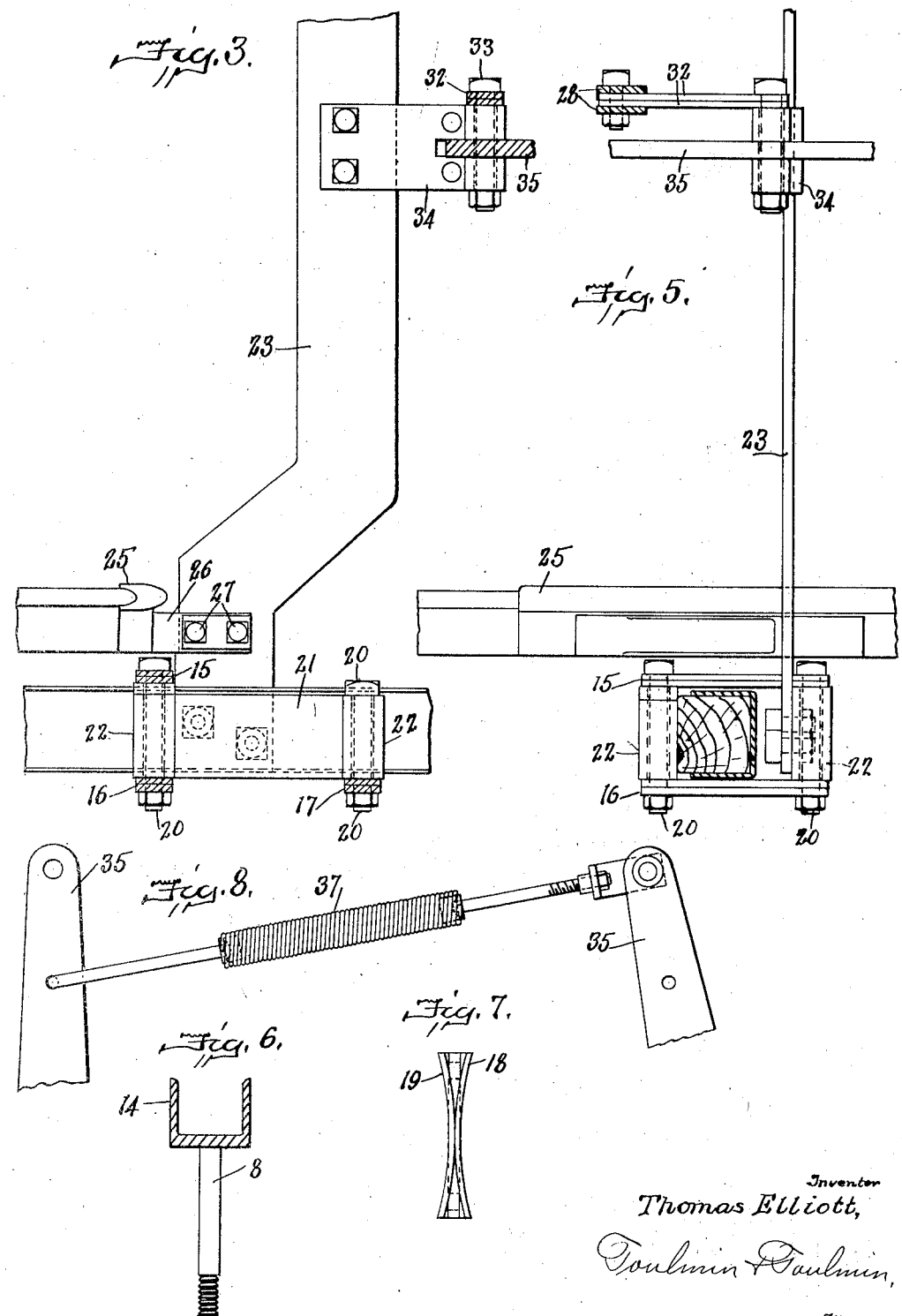

UNITED STATES PATENT OFFICE.

THOMAS ELLIOTT, OF CINCINNATI, OHIO, ASSIGNOR TO THE CINCINNATI CAR COMPANY, OF CINCINNATI, OHIO, A CORPORATION OF OHIO.

CAR-TRUCK.

1,335,225.  Specification of Letters Patent.  Patented Mar. 30, 1920.

Application filed June 9, 1919. Serial No. 302,718.

*To all whom it may concern:*

Be it known that I, THOMAS ELLIOTT, a citizen of the United States, residing at Cincinnati, in the county of Hamilton and State of Ohio, have invented certain new and useful Improvements in Car-Trucks, of which the following is a specification, reference being had therein to the accompanying drawing.

This invention relates to car trucks and has for its particular object to provide a truck frame with spring and brake equipment especially adaptable for single truck street cars.

An object of the invention is to provide a truck frame which, as assembled on the truck as a whole, is in effect an integral structure, the different frame members being secured together in a manner to make essentially a single unit frame.

A further object in the improved construction is to provide a frame in connection with which a standard M. C. B. journal box for the wheel axles may be used which has not heretofore been possible with the various types of frame construction used in single truck cars.

An important feature of the improved truck consists in the manner of applying to the truck frame an improved type of brake hangers which form the subject matter of a separate application for Letters Patent Ser. No. 302,718, filed June 9, 1919, but are included in the present application as a feature of the general organization of the present invention.

A further object of my invention is to provide a simple, effective spring arrangement in combination with the truck frame, whereby the weight of the car body and passenger load will be balanced and evenly distributed over the axles, thus acting to absorb the vibrations and shocks transmitted through the truck to the car body to the fullest extent possible and resulting in easy riding qualities of the car.

The arrangement of the springs, comprising as here shown, semi-elliptical springs secured to the truck frame directly over the wheel axles and having helical springs interposed between the ends thereof and the car body further acts to overcome in a large measure the end and side sway of the car which is characteristic of single truck cars of the usual types of construction, and is an objection well known to operators and to the public.

A further object of my improved frame construction is to provide a frame in which both lightness and strength are obtained in proper proportions, and in which a marked degree of flexibility or resiliency is obtained. Thus, without sacrificing strength, the frame coöperates with the springs to provide an easy riding car. To this end, the frame is preferably constructed of U-shaped channels having the channels reinforced with wood, thereby providing the required strength and flexibility in a frame of minimum weight.

In the accompanying drawings:

Fig. 2 is a side elevation of the truck shown in Fig. 1;

Figs. 3, 4 and 5 are plan, side elevation and cross sectional details, respectively, showing the manner of securing the brake hangers to the truck frame and suspending the brake beam and brake shoes thereon;

Fig. 6 is a detailed view of a special bolt used in mounting the semi-elliptical springs and in securing the journal boxes to the truck frame;

Fig. 7 is a detailed view of one pair of the spring plates used in the brake hangers and showing the manner in which the plates coöperate with each other to provide lateral spring tension at their opposite ends;

Fig. 8 is a detail of the brake retractor springs.

Figure 1:
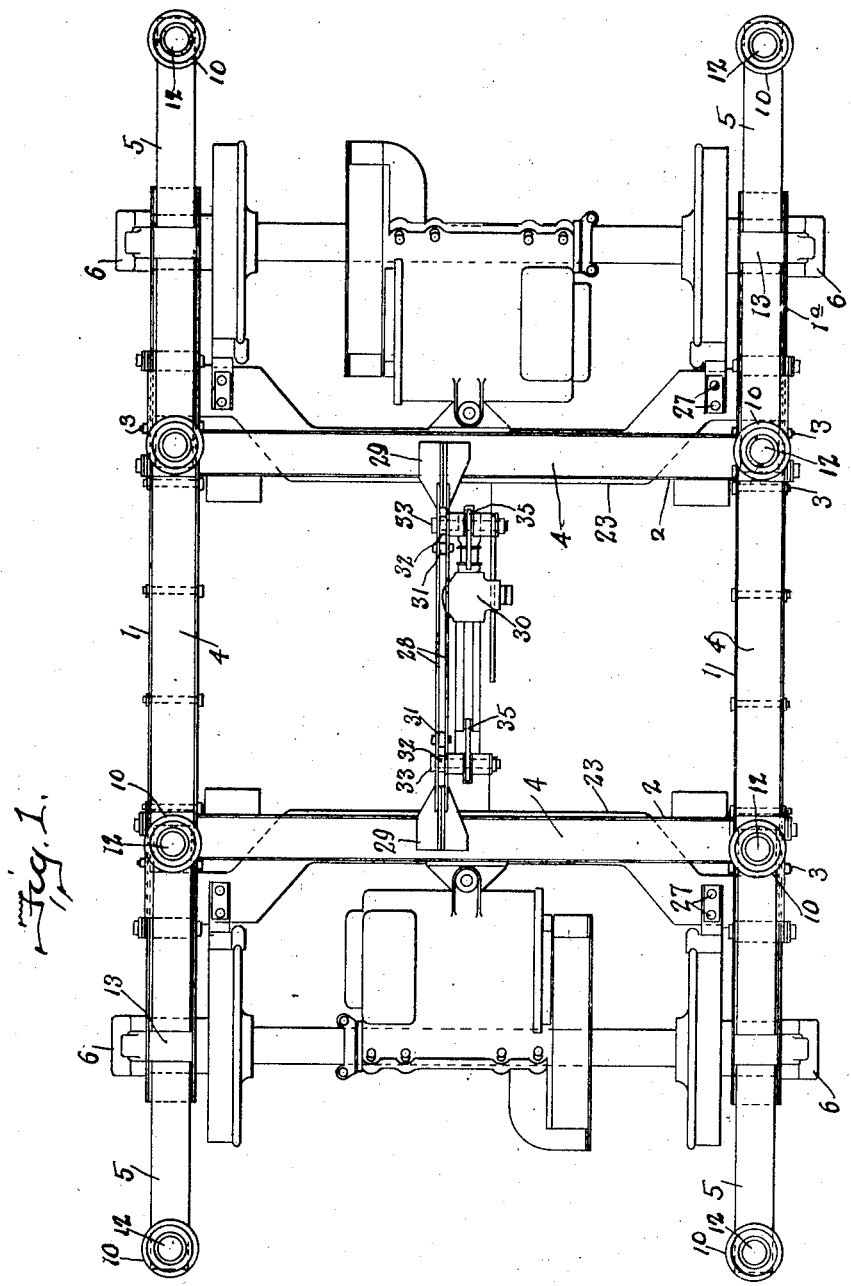
Figure 1 is a plan view of my improved truck showing the frame, brake hangers and springs in position thereon.

As here shown the truck frame is substantially rectangular shaped and consists of the two longitudinal side frame members 1 and the transverse or cross members 2 which may be secured to the side members in any suitable manner, as by bolts 3, thus making in effect an integral frame.

The frame is preferably constructed of channel steel, U-shaped in cross section, the channels being filled with any suitable material, such as wood sills 4 which are fitted into the channels and serve to reinforce the frame and act to deaden the noise of the truck transmitted through the frame, also to make the frame more or less resilient, aiding materially in combination with the truck springs to absorb the vibrations and shocks transmitted therethrough to the body of the car.

The side frame pieces 1 at their opposite ends have an upwardly extending off-set portion 1ª which serves as a seat for the semi-elliptical spring 5 and provides clearance space for the axle journal box 6, an arm or bracket member 7 being secured to the under side of the U-channel by bolts 7ª opposite the off-set portion thereof; bolts 8, a detail of which is shown in Fig. 6 of the drawings, being employed to hold the journal box in place between the projecting end of the frame 1 and the bracket 7.

It will be observed that the journal boxes here shown are of standard M. C. B. construction and that no special arrangement, other than off setting the side frame members is required to assemble the journal boxes to the frame. This feature of the improved truck is important as it enables usage of standard truck equipment where heretofore on single trucks of this character it has been necessary to use journal boxes especially designed for the particular type of frame used which did not meet with favor by the operators.

Interposed between the ends of the leaf springs and the cross sills 9 of the car body are helical or coiled springs 10, the springs being seated in the sills in sockets 11 and on the leaf springs, over retaining studs 12.

It will be observed that the weight of the opposite ends of the car is evenly distributed, as a result of the arrangement of the elliptical and helical springs, over the wheel axles. This results in a perfectly balanced car body and an even distribution of the passenger load upon the springs. The object of the arrangement is to reduce side and end sway of the car body and to minimize transmission of vibrations and shocks from the trucks thereto.

The plates of the leaf springs are held together at their central portion by a collar which fits within the channel of the frame pieces 1, the spring also extending through the channel of the off-set portion and having its upper surface substantially flush with the top edges of the channel flanges. The bolts 8 are provided with U-shaped heads, as shown in Fig. 6 of the drawings, the sides of the head flanges 14 serving as cheek plates on opposite sides of the spring blades to prevent lateral movement thereof.

As best shown in Figs. 3, 4 and 5 of the drawings the construction and arrangement of the brake hangers are of an improved form. The main object of the construction is to obtain an evenly balanced suspension of the brake beams and brake shoes, and more especially to cause the beams and shoes to swing on the frames and contact with the wheels in substantially a horizontal plane.

As here shown the side brake hangers of each group are arranged in sets of parallel members 15, 16 and 17, the hangers of each set consisting of two oppositely disposed spring plates 18—19, as shown in Fig. 7 of the drawings. The plates contact at their central portion and are curved outwardly from each other at their opposite ends to provide for lateral spring adjustment to compensate for wear in the hanger bearings and to make an anti-rattle joint.

The brake hangers of each set are spaced apart and joined together by hanger bolts 20 and upper and lower hanger plates 21 which are provided at their opposite ends with integral sleeves 22 through which the bolts 20 extend. The brake beams 23 are secured at their ends to the lower plates 21 by bolts 24, the brake shoes 25 being secured to the brake beams in the usual manner consisting of the brake shoe head 26 and bolts 27.

Interposed between the frame members 2 substantially at the longitudinal center line of the truck is the center brake hanger and slack adjuster mechanism, the latter constituting no part of the present invention is shown in conventional form only, being designated by the reference numeral 30. The brake hanger mechanism consists of two parallel truss bars or hanger supports 28 which are secured to the truck frame at their opposite ends by supporting angle plates 29, and are reinforced intermediate their ends by spacing blocks 31.

The brake beams 23 are suspended at their central portions from the truss frame 28 by single sets of brake hangers 32 which are pivotally supported in the frame 28 by bolts 33 and secured at their lower ends to the brake beams by the links 34, the brake levers 35 being pivoted near their lower ends in bearings 36 supported in the lower ends of the hangers 32, and the slack adjuster 30 being suspended between the opposite free ends of the levers 35 substantially as shown in Fig. 2 of the drawings. As shown in Fig. 8 of the drawings a retractor spring 37 is employed, preferably interposed between the levers 35, to normally retract the brake beams and shoes to prevent contact of the shoes with the wheels.

From the foregoing detailed description it will be apparent that my improved truck consists of a rectangular shaped frame which is in effect an integral structure, having its side and cross members formed preferably of U-shaped channeled steel, and the channels filled with wood to reinforce the same and to act to deaden the noise of the truck; of an off-set portion at the ends of the side frame members to provide suitable space for journal boxes of standard construction; of semi-elliptical springs mounted upon the off-set portions of the side frame above the vertical center of the wheel axles, and helical springs interposed between the free ends of the elliptical springs and the cross sills of the car body; and brake hangers arranged in pairs parallel to each other and acting to suspend the brake beams and shoes in a manner to cause the same to move substantially in a horizontal plane.

The use of the open top channel frame construction over the journal box of sufficient width to receive the elliptical springs enables lowering of the car body to the extent of the depth of the channels which is a material advantage in the operation of cars equipped with the improved trucks. Also supporting the weight of the car body by springs located directly above the axles permits the use of a much lighter truck than is the case with single trucks where springs are located on the truck frame more or less distant from the axle, the load being transmitted through the frame to the axle, as is the common practice in single truck construction. In the present construction there are no vertical guides or radius rods between the car body and truck, all driving strains and stresses being thus transmitted through the semi-elliptical and helical springs and absorbed or modified thereby before reaching the car body. In this respect the improved truck follows the most approved practice in automobile spring construction wherein a similar arrangement of semi-elliptical springs, known as the Hotchkiss drive is employed.

While as here shown I employ essentially the preferred construction and arrangement of my invention, I do not wish to be limited to the exact details shown as wide variations with respect to the detail features can readily be made by those skilled in the art without departing from the purpose and spirit of the invention.

Having thus fully described my invention, what I claim as new and desire to secure by Letters Patent, is:—

1. In a car truck, the combination, with wheels, axles and journal boxes of standard construction, a rectangular shaped frame constructed of reinforced steel suspended from said journal boxes substantially in the horizontal plane of said axles and having integral side members extending beyond the main frame and off-set to extend over the journal boxes, semi-elliptical springs secured in the channel of the off-set portions of said frame substantially over the vertical center of said axles, and helical springs interposed between the free ends of said springs and the cross sills of the car.

2. In a car truck, the combination, with wheels, axles and journal boxes of standard construction, a truck frame constructed of reinforced steel suspended from said journal boxes substantially in the horizontal plane of said axles and having integral side members extending beyond the main frame and off-set to extend over the journal boxes, semi-elliptical springs secured in the channel of the off-set portions of said frame substantially over the vertical center of said axles, and helical springs interposed between the free ends of said springs and the cross sills of the car.

3. In a car truck, the combination, with wheels, axles and journal boxes, a truck frame suspended from said journal boxes and having integral side members extending beyond the main frame and off-set to extend over the journal boxes, semi-elliptical springs secured in the channel of the off-set portions of said frame substantially over the vertical center of said axles, and helical springs interposed between the free ends of said springs and the cross sills of the car.

4. In a car truck, the combination, with wheels, axles and journal boxes, a truck frame constructed of reinforced steel channels suspended from and extending over the journal boxes, semi-elliptical springs secured in the channels of the frame substantially over the vertical center of said axles, and helical springs interposed between the free ends of said springs and the cross sills of the car.

5. In a car truck, the combination, with wheels, axles and journal boxes, a truck frame consisting of side and cross members substantially U-shaped in cross section and suspended from said journal boxes substantially in the horizontal plane of said axles and having its side members off-set to extend over the journal boxes, semi-elliptical springs supported on the off-set portions of said frame substantially over the vertical center of said axles, and helical springs interposed between the free ends of said springs and the cross sills of the car.

6. In a car truck, the combination, with wheels, axles and journal boxes, a truck frame constructed of upwardly turned U-channels filled with wood, suspended from said journal boxes substantially in the horizontal plane of said axles and having its side members off-set to extend over the journal boxes, semi-elliptical springs mounted on the off-set portions of said frame substantially over the vertical center of said axles, and helical springs interposed between the free ends of said springs and the cross sills of the car.

7. In a car truck, the combination, with wheels, axles and journal boxes, a truck frame constructed of U-channels filled with wood, suspended from the journal boxes and having the ends of its side members extending thereover, semi-elliptical springs mounted on said frame substantially over the vertical center of said axles, and helical springs interposed between the free ends of said springs and the cross sills of the car.

8. In a car truck, the combination, with wheels, axles and journal boxes, a rectangular-shaped truck frame constructed of U-shaped channels filled with wood, suspended from the journal boxes and having the projecting ends of its side members off-set and extending over the journal boxes, semi-elliptical springs mounted on the off-set portions of said frame substantially over the vertical center of said axles, and helical springs interposed between the free ends of said springs and the cross sills of the car.

9. In a car truck, the combination, with wheels, axles and journal boxes, a truck frame suspended from said journal boxes and having its side members off-set to extend over the journal boxes, semi-elliptical springs mounted on the off-set portions of said frame substantially over the vertical center of said axles, helical springs interposed between the free ends of said springs and the cross sills of the car, and bolts securing the frame to the journal boxes and having flanges extending over the opposite edges of the semi-elliptical springs to prevent lateral displacement thereof.

10. In a car truck, the combination, with wheels, axles and journal boxes, a truck frame suspended from said journal boxes and having its side members off-set to extend over the journal boxes, semi-elliptical springs mounted on the off-set portions of said frame substantially over the vertical center of said axles, helical springs interposed between the free ends of said springs and the cross sills of the car, bolts disposed on opposite sides of the journal boxes, securing the frames thereto and having oppositely disposed flanges extending over the edges of the semi-elliptical springs to serve as guides for the springs in the flexing movements thereof.

11. In a car truck, the combination, with wheels, axles and journal boxes, a truck frame suspended from said journal boxes and having its side members off-set to extend over the journal-boxes, semi-elliptical springs mounted on the off-set portions of said frame substantially over the vertical center of said axles, helical springs interposed between the free ends of said springs and the cross sills of the car, bolts disposed on opposite sides of the journal boxes securing the frames thereto, and cheek plates in the channels of said frame to prevent lateral displacement of the semi-elliptical springs.

12. In a car truck, the combination, with wheels, axles and journal boxes, a truck frame constructed of upwardly turned U-channels filled with wood, suspended from said journal boxes substantially in the horizontal plane of said axles and having its side members off-set to extend over the journal boxes, semi-elliptical springs mounted in the channels of the off-set portions of said frame substantially over the vertical center of said axles, and helical springs interposed between the free ends of said springs and the cross sills of the car.

In testimony whereof I affix my signature.

THOMAS ELLIOTT.